Dec. 15, 1953 M. B. ARISMAN ET AL Re. 23,750

DRIVER FOR VARIABLE RESISTORS

Original Filed March 17, 1949

Inventors
Mervin B. Arisman
Adrian J. Vaksvik
Ralph W. Magnusen
By Dra Milton Jones
Attorney Reissued Dec. 15, 1953 Re. 23,750

UNITED STATES PATENT OFFICE 23,750

DRIVER FOR VARIABLE RESISTORS

Mervin B. Arisman, Adrian J. Vaksvik, and Ralph W. Magnusen, Elkhart, Ind., assignors to Chicago Telephone Supply Corporation, Elkhart, Ind., a corporation of Indiana Original No. 2,484,667, dated October 11, 1949, Serial No. 81,872, March 17, 1949. Application for reissue April 21, 1951, Serial No. 222,244

7 Claims. (Cl. 201—55)

Matter enclosed in heavy brackets [ ] appears in the original patent but forms no part of this reissue specification; matter printed in italics indicates the additions made by reissue.

This invention relates to electrical control devices and refers particularly to variable resistance controls of the type used in radio and television apparatus. The invention is advantageous in situations where two control devices are connected in tandem with the shaft of one hollow and having the shaft of the other rotatable therein.

In such control rotation of the shaft sweeps a contactor across the face of a resistance element and to assure good electrical contact the contactor generally comprises spring fingers maintained under tension. To place and maintain these spring fingers under tension entails supporting the control shaft and, in fact, the entire rotating assembly of the control, against inward or rearward thrust.

In conventional controls of this type the shaft has an annular groove in line with the front end of the bushing through which the shaft protrudes and a C washer is seated into this groove to bear against the front end of the bushing and thus hold the shaft against rearward axial displacement. In the case of tandem controls where one control shaft operates within the other, this manner of holding the rotatable unit driven by the hollow control shaft against rearward axial displacement cannot be used since the hollow shaft does not have sufficient wall thickness to permit an annular groove to be cut therein. This is especially so in the very small controls recently developed for radio and television.

Consequently it has been the practice in the past to have the inner end of the hollow control shaft bear against the inner face of the cover of its control unit or against a hat-shaped washer supported thereon. However, the way in which the inner or rear end of the control shaft was secured to the driver which carries the contactor always involved ears struck from the shaft and bent over the rear face of the driver so that these ears constituted the rearmost portion of the rotatable assembly and perforce were the parts thereof which bore against and rode on the cover wall or washer supported thereon. This construction lacked the desired smoothness. Not only was the surface against which the ears bore inherently rough but since the ears were struck from portion of a tube they were arcuate in cross section, even after they were bent over. Precautions were taken to flatten the ears as much as possible but notwithstanding, the faces of the bent-over ears inevitably possessed a degree of concavity so that the actual contact with the wall of the cover was by the relatively sharp side edges of the ears.

Moreover, since the ears of necessity were relatively narrow, the thrust bearing formed by the engagement of the ears with the inner face of the cover or washer supported thereon was unstable and did not satisfactorily hold the rotating structure against wobbling.

With these and other objections to past constructions in mind, it is an object of the present invention to improve the end thrust bearing for the rotating element of a variable resistance device through the utilization of a novel driver which in itself incorporates an annular runner projecting rearwardly beyond the rearmost portion of the shaft to have a smooth running contact over a substantial area with the inner face of the cover wall.

Another object of this invention is to provide a driver for variable resistors which incorporates within itself the carrier for the contactor, a smooth annular thrust bearing surface, and rotation limiting stop abutments.

Still another object of this invention is to provide more accurate positioning of the contactor with respect to the resistance element than was possible with the previous built-up construction of the contactor-driver assembly in which the contactor was mounted on an insulated drive arm which in turn was fixed to a stamped metal arm secured to the shaft and termed the stop arm since it carried the stops for limiting rotation of the shaft. With this built-up construction of the positioning of the contactor, and hence the magnitude of the contact pressure and to a large degree the smoothness of operation was affected by several possible variables. The possible variations in the thickness of the insulated drive arm, the metal stop arm and the hat shaped thrust washer upon which the fastening ears rode, as well as the inevitable variations in the flatness of the ears and any possible variations in the thickness thereof all had an important bearing upon the accuracy of the positioning of the contactor.

The present invention eliminates these many variables affecting positioning of the contactor by providing a driver which is molded in one piece from suitable insulating material so that the contactor and operating shaft may be attached directly thereto and the rotation limiting abutments or stops formed as an integral part thereof. Thus since the possible variations in a molding are extremely slight the new construction assures uniform accuracy in the positioning of the contactor not obtainable with past constructions.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which.

Figure 1:
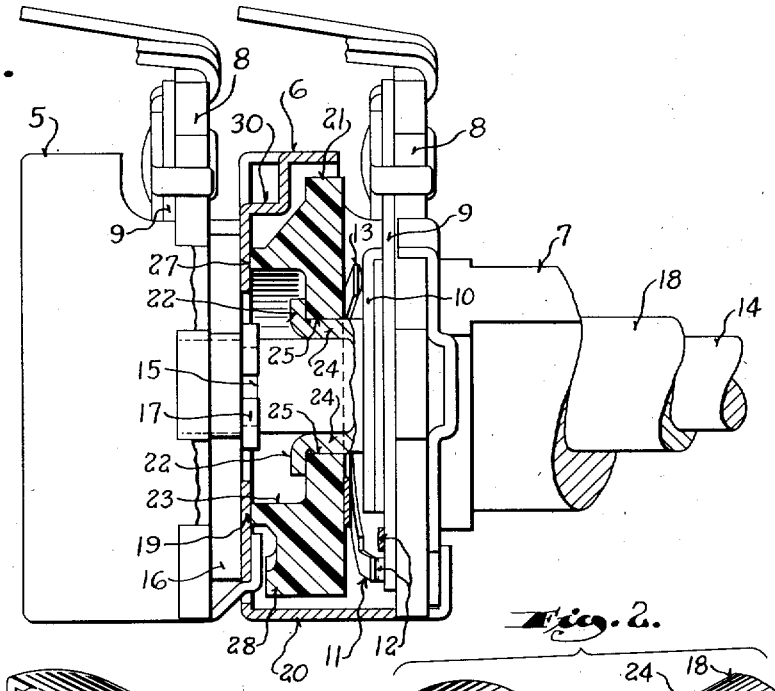
Figure 1 is a side view of a dual tandem variable resistance control embodying this invention, parts thereof being broken away and in section.
Figure 3:
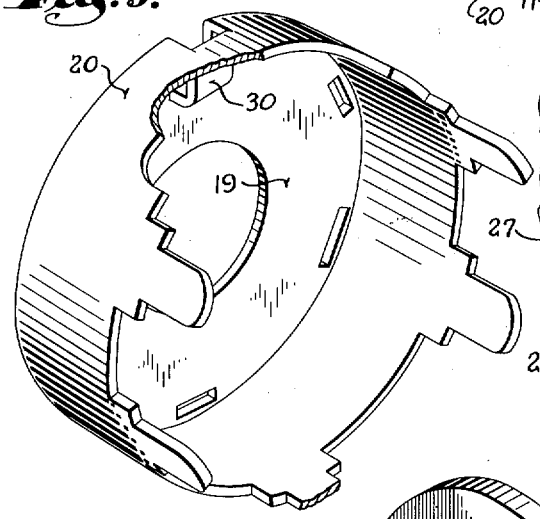
Figure 3 is a perspective view of the cup-shaped cover for this front unit showing its flat inner face against which the annular runner of the driver abuts when the parts are assembled.
Figure 2:
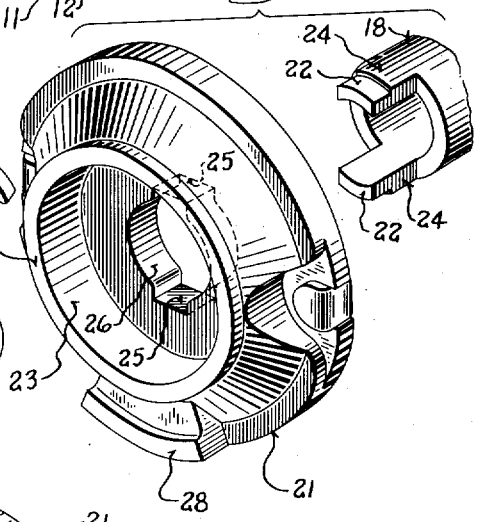
Figure 2 is a perspective view of the driver of the front unit which has the hollow shaft, and the adjacent inner end of its shaft shown disassembled.
Figure 4:
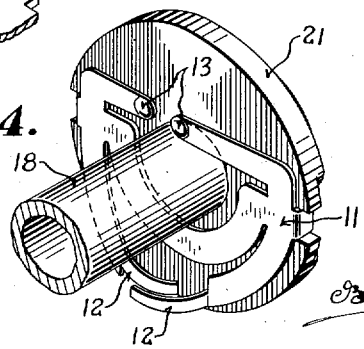
Figure 4 is a perspective view of the assembled driver and shaft and illustrating the same from the front thereof to show the manner in which the contactor is mounted on the driver.

Referring now particularly to the accompanying drawing, the numerals 5 and 6 designate the two units of a dual or tandem control of the type to which this invention pertains. In use both units are mounted on [the] *a* supporting panel (not shown) by means of a single mounting sleeve 7. Each of the two units comprises a base 8 having an arcuate resistance strip 9 and a collector ring 10 mounted on the inner face thereof. The usual terminals extend from the ends of the resistance strip and the collector ring.

A contactor indicated generally by the numeral 11 overlies the inner face of the base to be advanced along the resistance strip to effect the desired control function by rotation of a shaft journaled in the base. Spring contact fingers 12 and 13 on the contactor, respectively, bear against the resistance strip and the collector ring 10. As will be readily apparent the tension under which these spring contact fingers are maintained in the assembled condition of the control unit imparts a rearward or inward thrust to the contactor rotating assembly which, of course, must be opposed to retain the structure operatively assembled.

In the case of the rearmost control device 5 this requirement presents no serious problem since its rotating element is driven by a solid shaft 14. Being solid, an annular C washer receiving groove 15 can be cut into the shaft adjacent to the outer face of the base 8 or a spacing plate 16 overlying the same without objectionably weakening the shaft. An ordinary C washer 17 engaged in this groove bears against the spacing plate 16 to hold the shaft 14 and the parts mounted thereon against inward axial displacement.

In the case of the front control 6, however, other means must be provided to carry the inward thrust since its shaft 18, being hollow to rotatably receive the solid shaft, does not have sufficient wall thickness to permit cutting a C washer groove into it.

As noted hereinbefore, it was the practice in the past to utilize the end wall 19 of the cup-shaped cover 20 with which all control devices of this character are equipped to take the end thrust directly from the tubular shaft 18, the actual bearing being between outstruck ears on the end of the shaft by which the contactor driver was held to the shaft and the inner face of the wall 19 or a hat-shaped washer overlying the same. This past construction precluded the attainment and maintenance of the smooth operation necessary in controls of this kind. Even though special precautions were taken to flatten down the ears some degree of concavity inevitably remained and the resulting sharp side edges had a tendency to bite into the metal surface upon which the ears rode.

The present invention overcomes this objectionable characteristic of past constructions by obviating the exposed attaching ears through the substitution of a molded one piece contactor driver 21 for the built-up construction heretofore used. Though bent-over ears 22 are used to mount the driver 21 on the tubular shaft 18, the ears are set down into a central round recess 23 in the rear face of the driver. The ears 22 are the endmost portions of diametrically opposite lugs 24 which project from the shaft 18 and are seated in notches 25 in the wall of a hole 26 axially through the driver. The hole 26 has substantially the same diameter as the bore of the hollow shaft 18 so as to form a continuation thereof for the smooth reception of the solid shaft 14.

Since the recess 23 is deeper than the thickness of the ears the edge of the wall defining the sides of the recess constitutes the rearmost portion of the driver and provides an annular runner 27 which lies in a plane normal to the shaft axis and rides directly on the inner face of the cover wall 19.

Being relatively large in diameter, this annular runner provides a large bearing for the molded driver and since the tubular shaft is rigidly secured thereto this large bearing firmly holds the entire rotating unit against wobbling.

In addition to carrying the contactor and providing the rotating element of the thrust bearing, the molded driver 21 also serves the function of the stop plate of past constructions and to this end has a lug 28 integrally formed on its rear face. The sides of this lug provide abutments which coact with a stationary abutment formed by an instruck portion 30 on the cover 20 to limit rotation of the shaft.

From the foregoing description taken in connection with the accompanying drawing it will be readily apparent to those skilled in the art that this invention assures smooth operation in controls of the character described since the annular runner 27 can ride smoothly across the face of the cover wall 19, and in all positions of rotation holds the rotating elements firmly against wobbling, and that since the driver (of which the runner 27 is a part) is a molding, the contactor always will be properly and accurately positioned with respect to the resistance element.

It will also be evident that while the invention is especially valuable in the case of tandem controls where one of the shafts of necessity is a hollow tube of relatively small wall thickness, it is equally susceptible to use in controls which have solid shafts.

What we claim as our invention is:

[1. In an electrical control device having a base provided with a resistance element and a bushing, and having a cup-shaped cover attached to the base and coacting therewith to provide a housing: a shaft journaled in the bushing and projecting into the housing; a driver fixed to the shaft at the end thereof inside the housing, said driver having an annular rearward projection concentric to the shaft with the extreme rear edge of said projection lying in a plane normal to the shaft axis and beyond the adjacent end of the shaft so as to provide a smooth uninterrupted runner adapted to ride on and receive support from the bottom wall of the cup-shaped cover, whereby said runner and the bottom wall of the cup-shaped cover constitute a thrust bearing; and a contactor carried by the driver and interposed between the base and the driver, said contactor having spring contact fingers to resiliently bear against the resistance element and by the spring tension thereof hold the circular runner against the bottom of the cup-shaped cover.]

[2. In an electrical control, the combination with a base having a bearing and an annular resistance element concentric therewith and exposed on the inner face of the base, and a cup-shaped cover attached to the base and coacting therewith to provide a housing enclosing said resistance element, of: a shaft journaled in the bearing and projecting into the housing; a driver fixed to the shaft at the end thereof inside the housing; a contactor carried by the driver and having a spring contact finger to ride upon and resiliently bear against the resistance element; and an annular runner integral with the driver and extending rearwardly therefrom, said runner being concentric to the control shaft and its rearmost edge lying in a plane normal to the shaft axis and beyond the adjacent end of the shaft to ride upon and be supported by the inner face of the cup-shaped cover whereby said annular runner and the wall of the cover upon which it rides constitute a thrust bearing to hold the shaft and driver against inward displacement from a position maintaining the spring contact finger under tension.]

[3. An electrical control of the type having cooperating rotatable and stationary elements enclosed within a housing with the rotatable element movable by means of a shaft protruding from one wall of the housing, characterized by the provision of a thrust bearing comprising, the wall of the housing opposite that through which the shaft protrudes; and a part on the shaft bearing against said rear wall, the part on the shaft which engages the rear wall being a smooth annular runner concentric to the shaft axis with its rearmost edge lying in a plane perpendicular to said shaft axis and extending beyond the rearmost portion of the shaft so as to have a smooth running bearing upon the rear wall of the housing.]

[4. The electrical control set forth in claim 3 further characterized by the fact that said part on the shaft is a one piece molding of insulating material.]

[5. In an electrical resistance device: a base having a hole therethrough for the reception of a control shaft; a resistance element on the inner face of the base; a control shaft journaled in the hole in the base; a driver fixed to the shaft and overlying the inner face of the base, a spring contactor mounted on the driver and engaging the resistance element, the tension of the spring contactor imparting a rearward thrust to the driver and shaft; a cup-shaped cover positioned over the rear face of the base and coacting with the base to define a housing for the resistance element and contactor; and a thrust bearing to oppose the rearward thrust engendered upon the shaft and driver by the tension of the spring contactor, said thrust bearing comprising, a ring integral with the driver and projecting rearwardly therefrom beyond the rearmost portion of the shaft, the rear edge of said ring lying on a plane normal to the shaft axis and having a smooth sliding engagement with the adjacent end wall of the cup-shaped cover.]

[6. The electrical resistance device of claim 5 further characterized by the provision of cooperating stop abutments on the driver and the cup-shaped cover to define the limits of rotation of the rotatable elements of the control.]

[7. In a variable resistance device of the type in which a resistance element is traversed by a contactor driven by a rotatable control shaft passing through a hole in a base of insulating material, and wherein the control shaft is biased endwise toward the rear of the device: a cover attached to the base over the rear face thereof, said cover coacting with the base to form a housing for the device and having a wall substantially normal to the shaft axis and opposite the rear end of the shaft; a driver for the contactor fixed to the shaft inside the housing; and a circular runner on the rear of the driver extending beyond the rearmost portion of the shaft and throughout its entire circumference bearing against said wall of the cover to provide a smooth running thrust bearing for supporting the shaft against the rearward end thrust thereon.]

[8. The variable resistance device of claim 7 further characterized by the provision of cooperating stop abutments on the driver and the cover for limiting rotation of the driver and consequently the contactor.]

9. In a variable resistance device of the type in which a resistance element is traversed by a contactor driven by a rotatable control shaft passing through a hole in a base of insulating material, and wherein the control shaft is biased endwise toward the rear of the device: a cover attached to the base and disposed over the rear face thereof, said cover having an end wall substantially normal to the shaft axis and in line with the rear end of the shaft; a driver for the contactor fixed to the shaft and situated within the housing formed jointly by the cover and the base, said driver being a molding of insulating material and having a recess in its rear face, the side wall of said recess terminating in an annular runner lying in a plane normal to the shaft axis, the front face of the driver having a portion thereof abutting the end of the shaft *and said driver having a hole therethrough coaxial with said runner with notches in the wall of the hole*; [ears extended] *lugs extending longitudinally* from the shaft through the driver and into the recess at the rear face thereof, said [ears] *lugs* being *seated in said notches and having their free end portions* bent over the bottom of the recess to hold the driver to the shaft, said recess in the rear face of the driver being deeper than the thickness of the [ears] *bent over portions of the lugs* so that no portion of said [ears] *lugs* projects beyond the annular runner, and said runner bearing against the end wall of the cover and having a smooth sliding engagement therewith whereby the end wall of the cover and the runner coact to provide a thrust bearing for limiting rearward endwise motion of the control shaft.

[10. The variable resistance device of claim 9 further characterized by the fact that said annular recess in the rear face of the driver is substantially larger in diameter than the diameter of the shaft so that the engagement of the annular runner defined by the side wall of the recess with the inner face of the cover extends over a substantial area to firmly hold the shaft against wobbling.]

*11. The variable resistance device of claim 9 wherein the control shaft is provided with longitudinally extending lugs thereon passing through the driver in line with the recessed portion thereof to drivingly connect the shaft to the driver; and wherein the ears which hold the driver to the shaft are formed on the rear extremities of said lugs.*

*12. In an electrical control device having a base, a cup-shaped cover positioned over one face of the base and coacting therewith to define a housing, and a resistance element inside the housing on the inner face of the base: a control shaft projecting through a hole in the base and rotatably supported thereby with the rear end portion of the shaft inside the housing and the rearmost portions of the shaft terminating a distance forwardly of the end wall of the cover; a shoulder on the rear end portion of the control shaft lying between but spaced from the inner face of the base and the end wall of the cup-shaped cover, and facing the latter; a contactor cooperable with said resistance element; a driver wholly within the housing for driving said contactor, said driver having a coaxial hole therethrough with notches in the wall of the hole; tongues extending rearwardly from said shoulder on the control shaft and bent over at their rear extremities to mount the driver on the rear end portion of the control shaft for rotation therewith and with the driver clamped against said shoulder thereon and confined between said shoulder and the end wall of the cup-shaped cover so that the driver is supported entirely by the control shaft; and a circular runner on the rear of the driver extending beyond the rearmost portions of the control shaft but concentric thereto, the rearmost edge of said runner lying in a plane normal to the shaft axis and bearing against the end wall of the cup-shaped cover to have smooth sliding engagement therewith, whereby the end wall of the cover and the runner coact to provide a thrust bearing for limiting rearward endwise motion of the control shaft.*

*13. In an electrical control device having a base, a cup-shaped cover positioned over one face of the base and coacting therewith to define a housing, and a stationary control element inside the housing on the inner face of the base: a control shaft projecting through a hole in the base and rotatably supported thereby with the rear end portion of the shaft inside the housing and the rear extremity of the shaft terminating a distance forwardly of the end wall of the cover; a shoulder on the rear end portion of the shaft lying between but spaced from the inner face of the base and the end wall of the cover, and facing the latter; a movable control element in the housing overlying the inner face of the base and cooperable with the stationary control element thereon; a driver wholly within the housing for driving said movable control element; means mounting the driver on the rear end portion of the control shaft, with the driver in juxtaposition to said shoulder on the shaft, including a hub portion on the driver provided with a hole therethrough to receive the rear end portion of the control shaft, lugs on the rear end portion of the control shaft engaged in notches opening to the hole in the driver hub for connecting the driver to the shaft for rotation therewith, and retaining means on the rear extremity of the shaft, rearwardly of said shoulder thereon, and lying behind the driver to preclude rearward displacement thereof from the rear end portion of the shaft; and runner means on the driver rearwardly of the driver retaining means and engaged with the end wall of the cover to preclude contact of the retaining means therewith and to provide a thrust bearing for supporting the control shaft against rearward end thrust thereon.*

*14. In an electrical control device of the type having cooperating stationary and movable control elements contained within a housing provided with spaced opposite front and rear end walls, with the stationary control element overlying and secured to the inner face of the front end wall: a control shaft projecting through a hole in the front end wall and rotatably supported thereby with the rear end portion of the shaft inside the housing and the rear extremity of the shaft terminating a distance forwardly of the rear end wall of the housing; a driver wholly within the housing for driving the movable control element, said driver having a central portion providing a hub, and said hub having a hole therethrough to receive the rear end portion of the shaft and provide for mounting the driver on the shaft; cooperating means on the driver hub and the rear end portion of the shaft connecting the driver to the shaft for rotation therewith; axially spaced opposing abutments on the rear end portion of the shaft between which the hub portion of the driver is confined; and runner means on the driver rearwardly of the rearmost abutments on the shaft and engaged with the rear end wall of the housing to preclude contact of the rearmost abutments therewith and to provide a thrust bearing for supporting the control shaft against rearward end thrust thereon.*

*15. In an electrical control device of the type having cooperating stationary and movable control elements contained within a housing provided with spaced opposite front and rear end walls, with the stationary control element overlying and secured to the inner face of the front end wall: a control shaft projecting through a hole in the front end wall and rotatably supported thereby with the rear end portion of the shaft inside the housing and having tongues extending rearwardly therefrom and terminating a distance forwardly of the rear end wall of the housing; a driver wholly within the housing for driving the movable control element, said driver having a central hole therethrough with notches in the wall of said hole to receive said tongues on the shaft and provide for mounting the driver on the shaft, and having a centrally disposed recess in its side opposite the rear end wall of the housing; an abutment on the rear end portion of the shaft overlying the front side of the driver; an abutment on the rear extremity of each of said tongues on the shaft overlying the rear side of the driver and cooperating with the first designated abutment to hold the driver on the rear end portion of the shaft, said last named abutments lying wholly within said recess in the rear of the driver; and runner means on the driver spaced a distance rearwardly of said last abutments and engaged with the rear end wall of the housing to preclude contact of said last named*

*abutments therewith and to provide a thrust bearing for supporting the control shaft against rearward end thrust thereon.*

*16. The electrical control device set forth in claim 15 wherein said control shaft has a coaxial bore of substantially uniform diameter no larger than the central hole in the driver extending entirely through the shaft.*

MERVIN B. ARISMAN.
ADRIAN J. VAKSVIK.
RALPH W. MAGNUSEN.

References Cited in the file of this patent or the original patent

UNITED STATES PATENTS

| Number | Name | Date |
|---|---|---|
| 2,358,991 | Miller | Sept. 26, 1944 |
| 2,437,166 | Lodge | Mar. 2, 1948 |
| 2,594,493 | Puerner | Apr. 29, 1952 |

FOREIGN PATENTS

| Number | Country | Date |
|---|---|---|
| 474,200 | Great Britain | Oct. 27, 1937 |
| 814,209 | France | Mar. 15, 1937 |